(12) United States Patent
Benneker et al.

(10) Patent No.: US 7,090,817 B2
(45) Date of Patent: Aug. 15, 2006

(54) PROCESS FOR THE PREPARATION OF HYDROXYLAMMONIUM

(75) Inventors: Arno Herald Benneker, Doenrade (NL); Johannes A. L. Brouwers, Sint Joost (NL); Godefridus M. Van Dortmont, Grevenbicht (NL)

(73) Assignee: DSM IP Assets B.V., Heerlen (NL)

( * ) Notice: Subject to any disclaimer, the term of this patent is extended or adjusted under 35 U.S.C. 154(b) by 14 days.

(21) Appl. No.: 10/483,077

(22) PCT Filed: Jul. 11, 2002

(86) PCT No.: PCT/NL02/00460

§ 371 (c)(1),
(2), (4) Date: Jul. 16, 2004

(87) PCT Pub. No.: WO03/006368

PCT Pub. Date: Jan. 23, 2003

(65) Prior Publication Data

US 2005/0047987 A1    Mar. 3, 2005

(30) Foreign Application Priority Data

Jul. 12, 2001    (EP) ................... 01202671

(51) Int. Cl.
*C01B 21/20* (2006.01)
*C07D 201/04* (2006.01)

(52) U.S. Cl. ............... 423/387; 540/535; 568/362; 585/266; 585/271

(58) Field of Classification Search ........... 423/387; 585/266, 271; 540/535; 568/362
See application file for complete search history.

(56) References Cited

U.S. PATENT DOCUMENTS

| | | | |
|---|---|---|---|
| 3,313,595 A | | 4/1967 | Hermann Meier et al. |
| 3,767,758 A | * | 10/1973 | Mars et al ................. 423/302 |
| 4,507,271 A | | 3/1985 | Van Deyck et al. |
| 5,489,421 A | | 2/1996 | Van Velzen et al. |
| 5,792,439 A | * | 8/1998 | van Lieshout et al. ...... 423/387 |

FOREIGN PATENT DOCUMENTS

| | | | |
|---|---|---|---|
| EP | 113 023 | | 7/1984 |
| EP | 773189 | * | 5/1997 |
| NL | 6908934 | | 12/1970 |
| WO | 93 08121 | | 4/1993 |
| WO | 98/18717 | * | 5/1998 |

* cited by examiner

*Primary Examiner*—Wayne A. Langel
(74) *Attorney, Agent, or Firm*—Mayer, Brown, Rowe & Maw LLP

(57) ABSTRACT

The invention relates to a process for the preparation of hydroxylammonium, said process comprising the steps of:
a) feeding gaseous hydrogen to a reaction mixture, said reaction mixture comprising an aqueous reaction medium and a gaseous phase;
b) catalytically reducing, in said reaction mixture, nitrate or nitrogen oxide with hydrogen to form the hydroxylammonium;
c) withdrawing a gas mixture from the reaction mixture, said gas mixture comprising gaseous hydrogen and gaseous non-hydrogen compounds;
d) separating at least part of the gaseous non-hydrogen compounds from the gas mixture to obtain a hydrogen-enriched gas; and
e) passing the hydrogen-enriched gas to a hydrogenation zone.

13 Claims, 1 Drawing Sheet

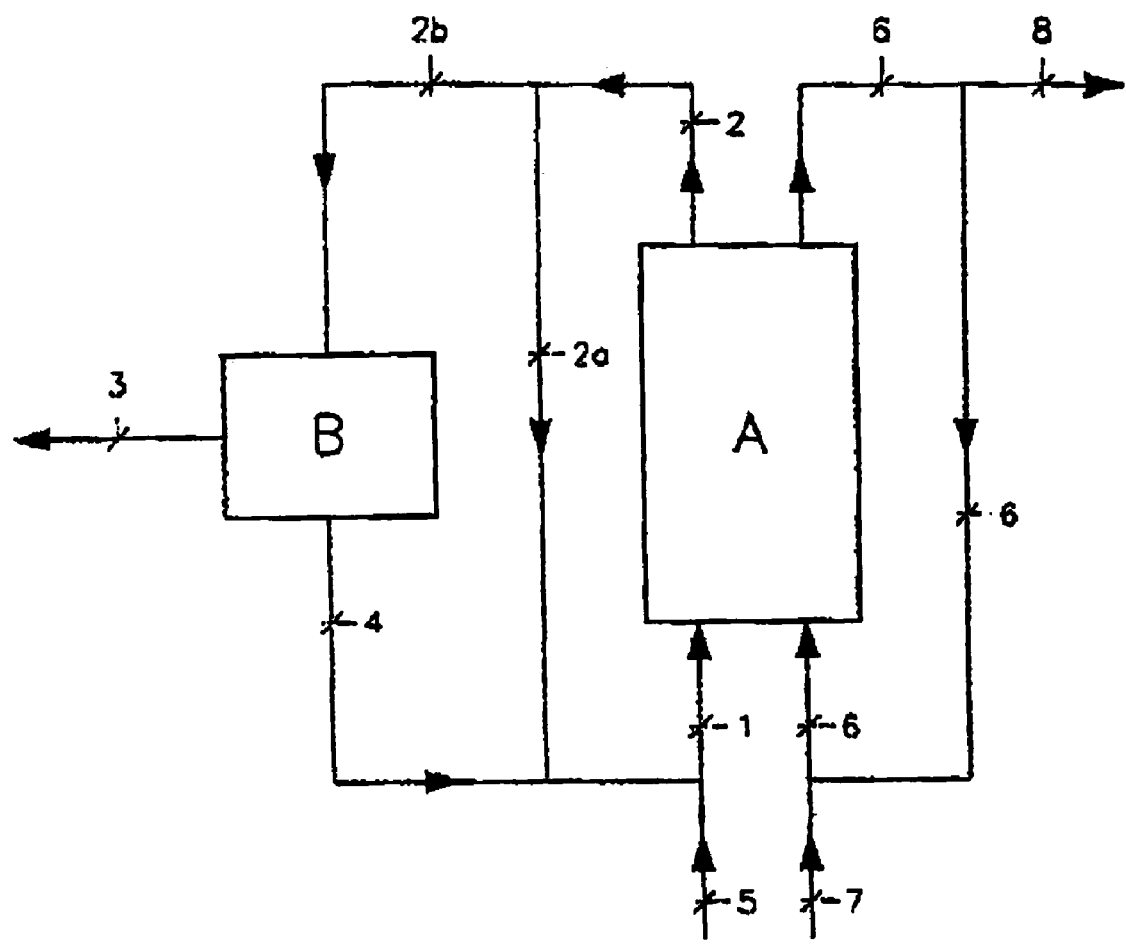

PROCESS FOR THE PREPARATION OF HYDROXYLAMMONIUM

CROSS REFERENCE TO RELATED APPLICATION

This application is the National Phase of International Application PCT/NL02/00460 filed Jul. 11, 2002 which designated the U.S., and that International Application was published under PCT Article 21(2) in English.

The invention relates to a process for the preparation of hydroxylammonium by catalytically reducing nitrate with hydrogen.

Hydroxylammonium can be formed by reducing nitrate with hydrogen. The reaction can be effected in aqueous reaction medium in the presence of a catalyst, e.g. palladium and/or platinum on a carrier. The reduction of nitrate can be represented as follows:

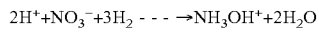

EP-A-773189 and WO-A-9818717 describe a process for the production of hydroxylammonium by catalytic reduction of nitrate with hydrogen. Gaseous hydrogen is fed to a reaction mixture in which the reduction is effected. An off-gas is continuously withdrawn from the reaction mixture, and analyzed, the off-gas including $H_2$, $N_2$, NO and $N_2O$.

NL-A-6908934 describes a process for the production of hydroxylammonium wherein gaseous hydrogen is continuously fed into a bubble column, in which nitrate is catalytically reduced in a reaction mixture comprising an aqueous reaction medium and a gaseous phase. A gas mixture is withdrawn from the bubble column. The gas mixture contains gaseous hydrogen and gaseous non-hydrogen compounds, such as for instance by-products of the reaction or inerts which may be fed to the reaction mixture together with the hydrogen. It is described that the gas mixture withdrawn is recycled into the bubble column or purged in whole or in part. In practice, such purge is used to operate the process for an extended period of time.

Disadvantage of the process of NL-A-6908934 is that either the efficiency, i.e. the molar quantity of desired product obtained per molar quantity of hydrogen fed to the reaction zone, is relatively low, or the activity, i.e. the molar quantity of hydroxylammonium formed per hour per kilogram of catalyst and the selectivity, i.e. the molar quantity of hydroxylammonium formed per mol of converted starting product, are relatively low.

We observed that a relatively low efficiency is obtained when the purge stream is relatively large and that the activity and selectivity are relatively low for a relatively small purge stream.

Goal of the invention is to provide a process, wherein a high efficiency, activity and selectivity can be combined.

BRIEF DESCRIPTION OF THE DRAWING

The accompanying FIGURE is a schematic flow diagram illustrating an embodiment of a system for carrying out an embodiment of the present invention.

This goal is achieved according to the invention by providing a process for the preparation of hydroxylammonium, said process comprising:

a) feeding gaseous hydrogen to a reaction mixture, said reaction mixture comprising an aqueous reaction medium and a gaseous phase;

b) catalytically reducing, in said reaction mixture, nitrate with hydrogen to form the hydroxylammonium;

c) withdrawing a gas mixture from the reaction mixture, said gas mixture comprising gaseous hydrogen and gaseous non-hydrogen compounds; characterized in that the process also comprises:

d) separating at least part of the gaseous non-hydrogen compounds from the gas mixture to obtain a hydrogen-enriched gas; and e) passing the hydrogen-enriched gas to a hydrogenation zone.

According to one aspect of the invention the efficiency is increased with no or only limited decrease of the activity and/or selectivity. According to another aspect of the invention the activity and/or selectivity are increased with no or only limited decrease of efficiency. According to a further aspect of the invention the activity and/or selectivity and the efficiency are increased.

The hydrogen-enriched gas may be passed to any hydrogenation zone in which a hydrogenation reaction is effected. Examples of hydrogenation reactions are hydrogenation of benzene and hydrogenation of phenol. Preferably, the hydrogen-enriched gas is passed to a hydrogenation zone in a production process for caprolactam and/or for intermediates thereof, such as for instance hydrogenation of benzene, hydrogenation of phenol and/or reduction of nitrate or nitrogen oxide. Most preferably, the hydrogen-enriched gas is passed to the reaction mixture. It is possible to pass the hydrogen-enriched gas directly to the reaction mixture. It is also possible to combine the hydrogen-enriched gas first with other gas streams which are fed to the reaction mixture.

The separation is not limited to a specific separation technique. Membrane separation, adsorption techniques, including for instance pressure swing adsorption, and cryogene distillation may be used. The separation may be effected using membrane separation. Any suitable membrane may be used. Suitable membranes include membranes having a higher permeability for gaseous $H_2$ than for the gaseous non-hydrogen compounds to be separated. Membranes made from polyimide may be used. Membrane separation is for instance described in "Membrane Separations Technology, Principles and Applications", R. D. Noble and S. A. Stem eds., Elsevier Science B. V, The Netherlands (1995) ISBN 0-444-81633-X, pp. 632–644 and "Handbook of Industrial Membrane Technology", M. C. Porter, ed., Noyes Publications, New Jersey, USA (1988) ISBN 0-8155-1205-8, pp. 579–588. Adsorption, preferably pressure swing adsorption, is advantageously used when the hydrogen-enriched gas is passed into the reaction mixture. This has the advantage that recycling may be effected with no or only limited re-pressurizing of the hydrogen-enriched gas after separation. Adsorption techniques are for instance described in "Gas Separation by Adsorption Processes", by R. T. Yang, Imperial College Press, UK (1999) ISBN 1-86094-047-1, pp. 255–260. The separation may be carried out by feeding the entire gas mixture or a part of the gas mixture to a separator and by withdrawing the hydrogen-enriched gas from the separator. When feeding only part of the gas mixture to the separator, the part which is not fed to the separator, is preferably recycled to the reaction mixture.

The gas mixture withdrawn from the reaction zone comprises gaseous hydrogen ($H_2$) and gaseous non-hydrogen compounds. As used herein, hydrogen refers to $H_2$, and gaseous non-hydrogen compounds refer to gaseous compounds other than $H_2$. The gaseous non-hydrogen compounds may for example include $CH_4$, $H_2O$, NO, $NO_2$, $N_2$, and/or $N_2O$. The gaseous non-hydrogen compounds may for instance include by-products of the reduction (e.g. $H_2O$, NO, $NO_2$, $N_2$, and/or $N_2O$) and/or compounds which may be fed to the reaction zone together with the gaseous hydrogen (e.g. $CH_4$, and/or $N_2$).

The molar fraction of hydrogen in the gas mixture (with respect to the total molar quantity of all gaseous compounds in the gas mixture, i.e. the molar quantity of $H_2$ in the gas mixture divided by the sum molar quantity of all gaseous compounds in the gas mixture) is not limited to a specific value. A gas mixture may for example withdrawn in which the molar fraction of hydrogen is higher than 0.35, preferably higher than 0.4, more preferably higher than 0.5, most preferably higher than 0.6. Increasing the molar fraction of hydrogen in the gas mixture has the advantage that the hydrogen partial pressure in the reaction mixture is brought to a higher level (for a constant total pressure). There is no specific upper limit for the molar fraction of hydrogen in the gas mixture. For practical reasons, the molar fraction of hydrogen in the gas mixture is usually lower than 0.95, in particular lower than 0.9.

The hydrogen partial pressure in the reaction mixture may be higher than 0.9 MPa, preferably higher than 1.0 MPa, more preferably higher than 1.3 MPa, most preferably higher than 1.5 MPa. An increased hydrogen partial pressure in the reaction mixture has the advantage that the activity and/or selectivity is increased. As used herein the hydrogen partial pressure in the reaction mixture refers to the molar fraction of hydrogen in the gas mixture multiplied by the total pressure in the reaction mixture. Preferably, the total pressure in the reaction mixture is higher than 1.5 MPa, more preferably higher than 2.0 MPa, most preferably higher than 2.5 MPa. The total pressure in the reaction mixture is preferably lower than 4.0 MPa, more preferably lower than 3.5 MPa, in particular lower than 3.0 MPa.

The molar fraction of non-hydrogen compounds in the gas mixture may very between wide ranges. The molar fraction of $N_2$ in the gas mixture may for example be between 0.02 and 0.65, preferably between 0.05 and 0.5. If $CH_4$ is present in the gas mixture, the molar fraction of $CH_4$ in the gas mixture may for example be between 0 and 0.65, preferably between 0 and 0.5. The molar fraction of $N_2O$ in the gas mixture may for example be between 0.001 and 0.08, preferably below 0.05, more preferably below 0.03. The molar fractions are given with respect to the sum molar quantity of all gaseous compounds in the gas mixture.

According to the invention at least part of the gaseous non-hydrogen compounds are separated from the gas mixture. Gaseous non-hydrogen compounds which are advantageously separated include for instance $N_2O$, $N_2$, NO, $NO_2$, $H_2O$ and/or $CH_4$.

According to the invention the separation of gaseous non-hydrogen compounds from the gas mixture results in a hydrogen-enriched gas. The molar fraction of hydrogen in the hydrogen-enriched gas (with respect to the total molar quantity of all gaseous compounds in the hydrogen-enriched gas. i.e. the molar quantity of $H_2$ in the hydrogen-enriched gas divided by the sum molar quantity of all gaseous compounds in the hydrogen-enriched gas) is higher than the molar fraction of hydrogen in the gas mixture (with respect to the total molar quantity of all gaseous compounds in the gas mixture). Preferably, the molar fraction of hydrogen in the hydrogen-enriched gas is at least 0.05 higher than the molar fraction of hydrogen in the gas mixture, more preferably at least 0.1, most preferably 0.2 higher than the molar fraction of hydrogen in the gas mixture. Preferably, the molar fraction of $N_2O$ in the hydrogen-enriched gas is lower than the molar fraction of $N_2O$ in the gas mixture. Preferably, the molar fraction of $N_2$ in the hydrogen-enriched gas is lower than the molar fraction of $N_2$ in the gas mixture. If $CH_4$ is present in the gas mixture, the molar fraction of $CH_4$ in the hydrogen-enriched gas is preferably lower than the molar fraction of $CH_4$ in the gas mixture.

The reaction mixture comprises an aqueous reaction medium and a gaseous phase. Typically, the aqueous reaction medium is acidic, the pH preferably being between 0.5 and 6, more preferably between 1 and 4. Preferably, the aqueous reaction medium is buffered. Preferably, the aqueous reaction medium contains sulfuric acid or phosphoric acid, more preferably phosphoric acid. Preferably, the phosphate concentration in the aqueous reaction medium is higher than 2.0 mol/l. Preferably, an aqueous product stream containing the hydroxylammonium formed is withdrawn from the aqueous product stream medium, the concentration hydroxylammonium in the aqueous product stream preferably being higher than 0.8 mol/l. The gaseous phase generally contains hydrogen, and non-hydrogen compounds, the composition being dependent on the relative flow rates of the hydrogen and non-hydrogen compounds to and from the reaction mixture and on the rate at which the reduction is effected. The relative volume of the gaseous phase may vary between wide ranges. Preferably, the volume percentage of the gaseous phase is between 15 to 50 vol. % (relative to the volume of aqueous reaction medium plus the volume of the gaseous phase plus the volume of the catalyst).

The nitrate ($NO_3^-$) may be reduced at any suitable temperature, for instance at a temperature ranging from 20 to 100° C., preferably 30–90° C., more preferably 40–65° C. The reaction mixture comprises a catalyst. Preferably, the catalyst comprises a precious metal on a support, preferably platinum, palladium, or a combination of palladium and platinum on a support. Preferably, the support comprises carbon or alumina support, more preferably carbon. The catalyst employed in the reaction zone preferably comprises between 1 to 25 wt. %, more preferably between 5 to 15 wt. % of the precious metal, relative to total weight of support plus catalyst. Preferably, the catalyst further comprises an activator. The activator is preferably selected from the group consisting of Cu, Ag, Au, Cd, Ga, In, Tl, Ge, Sn, Pb, As, Sb and Bl, most preferably Ge. Generally, the catalyst is present in an amount of 0.2–5 wt. % relative to the total liquid weight of the aqueous reaction medium. The reduction may be effected in any suitable reactor, for instance a reactor with a mechanical stirrer or a column, most preferably a bubble column. An example of suitable bubble column is described in NL-A-6908934. Preferably, the process according to the invention is process is a continuous process.

An embodiment of the process according to the invention will now be described with reference to FIG. 1. However the process according to the invention is not limited to this embodiment.

In FIG. 1, the reaction mixture is present in a reactor A, in this case a bubble column. The aqueous reaction medium and catalyst are continuously passed through (A) by circulation via line (6). The catalyst comprises a precious metal on a support. A liquid feed stream, containing nitrate is fed to the reaction mixture via line (7) by introducing it into circulation (6). An aqueous product stream containing hydroxylammonium is withdrawn (using a filter unit, not shown) via line (8). A gaseous stream containing gaseous hydrogen is fed to the reaction mixture via line (1). A gas mixture containing hydrogen and non-hydrogen compounds is withdrawn from the reaction mixture via line (2). Part of the gas mixture is recycled to the reaction mixture via line (2a). Another part of the gas mixture is passed to separator (B) via line (2b). In separator (B) at least part of the non-hydrogen compounds is separated from the gas mixture via line (3), resulting in a hydrogen-enriched gas. The hydrogen-enriched gas is withdrawn from separator (B) via line (4). A gaseous feed stream containing hydrogen to be converted is supplied via line (5) and combined with the hydrogen-enriched gas (supplied via line (4)) and the gas mixture (circulated via line (2a)) to form the gaseous stream which is fed to the reaction mixture via line (1). Separator B may include one or more membrane separation units or a pressure swing absorption unit.

The invention will be further elucidated with reference to the following examples. These examples should not be construed as limiting the present invention.

REFERENCE EXPERIMENT (A) AND EXAMPLES I–III

In all examples hydroxylammonium is prepared using a set-up as indicated in FIG. 1 by using membrane separation in reference experiment (A) the same set-up is used with the exception that the gas mixture withdrawn via line (2b) is not fed to separator (B), but purged instead without being recycled to reaction zone (A). In all examples and in the comparative experiment the aqueous reaction medium and catalyst (10% Palladium on activated carbon, weight percentage given with respect to the sum weight of palladium+ activated carbon. The catalyst was activated with 4.5 g $GeO_2$ per kg of catalyst) is continuously recycled via line (6), the aqueous reaction medium exiting reaction zone (A) containing 1.625 mol/l $NH_3OH.H_2PO_4$, 1.125 mol/l $NH_4NO_3$, 1.50 mol/l $NH_4H_2PO_4$ and 0.75 mol/l $H_3PO_4$. Per hour 45 kmol of hydroxylammonium is produced which is withdrawn via line (8) (flow rate 27.7 m³/hour). The flow rate of the aqueous reaction medium exiting reaction zone (A) via line (6) is a factor 10 higher than the flow rate of the product stream withdrawn via line (8). The flow rate of the gas mixture circulating via line (2a) is a factor 5.2 higher than that of the gaseous feed stream supplied via line (5). The temperature in reaction zone A is 54° C., the total in the reaction mixture 2.65 MPa.

The following definitions are used.

$H_2$ partial pressure: molar fraction of hydrogen in the gas mixture withdrawn via line (2), multiplied by the total pressure.

$NO_3^-$ selectivity: moles of hydroxylammonium formed per mol of converted $NO_3^-$ $H_2$ selectivity: moles of hydroxylammonium formed per 3 moles of converted $H_2$ activity: moles of hydroxylammonium formed per hour per kilogram of catalyst $H_2$ efficiency: moles of hydroxylammonium formed per 3 moles of $H_2$ supplied to the reaction zone (via line (5)).

Reference Experiment A

Hydroxylammonium is prepared as described above, whereby the gas mixture withdrawn via line (2b) is not fed to separator (B), but purged instead. The amount of catalyst used is 567 kg. Per hour 202.3 kmol hydrogen is supplied via line (5). The flow rate of the gas mixture withdrawn via line (2b) is 36.0 kmol/hr, the molar fraction of hydrogen being 0.461. The composition of the various gas flows are indicated in table 1. The following results are obtained.

$H_2$ partial pressure: 1.22 MPa
$H_2$ selectivity: 72.7%
activity: 79.4 mol·hr⁻¹·kg⁻¹.
$NO_3^-$ selectivity: 75.1%
Efficiency: 67%

Example I

The process is carried out according to the invention by repeating reference experiment A, the difference being that the gas mixture withdrawn via line (2b) is fed to separator (B) and that the hydrogen-enriched gas obtained is recycled to the reaction zone. The hydrogen supply (via line (5)) is decreased to 193.7 kmol/hr.

The composition of the various gas flows are indicated in table 1. The following results are obtained.

$H_2$ partial pressure: 1.22 MPa
$H_2$ selectivity: 72.7%
activity: 79.4 mol·hr⁻¹·kg⁻¹.
$NO_3^-$ selectivity: 75.1%
Efficiency: 70%

This example shows that the efficiency is increased from 67% to 70% without decreasing the activity and selectivity.

Example II

The process is carried out according to the invention by repeating reference experiment A, the difference being that the gas mixture withdrawn via line (2b) is fed to separator (B) and that the hydrogen-enriched gas obtained is recycled to the reaction zone. The flow rate of the gas mixture withdrawn via line (2b) is increased from 36.0 to 57.1 kmol/hr, the molar fraction of hydrogen being 0.655. The amount of catalyst is decreased from 567 kg to 509 kg. The composition of the various gas flows are indicated in table 1. The following results are obtained $H_2$ partial pressure: 1.73 MPa
$H_2$ selectivity, 74.4%
activity: 88.4 mol·hr⁻¹·kg⁻¹.
$NO_3^-$ selectivity: 76.5%
Efficiency: 67%

This example shows that the activity and selectivity is increased without decreasing the efficiency. This has the advantage that less catalyst is needed. The increased $H_2$ selectivity is advantageous, since fewer by-products are formed. The increased $NO_3^-$ selectivity is advantageous, since fewer by-products are formed and since less $NO_3^-$ is converted per quantity of hydroxylammonium formed.

Example III

The process is carried out according to the invention by repeating reference experiment A, the difference being that the gas mixture withdrawn via line (2b) is fed to separator (B) and that the hydrogen-enriched gas obtained is recycled to the reaction zone. The supply of hydrogen is decreased from 202.3 kmol/hr to 198.0 kmol/hr. The flow rate of the gas mixture withdrawn via line (2b) is increased from 36.0 to 50.9 kmol/hr, the molar fraction of hydrogen being 0.617. The amount of catalyst is decreased from 567 kg to 521 kg. The hydrogen supply (via line (5)) is decreased from 202.3 kmol/hr to 198 kmol/hr. The composition of the various gas flows are indicated in table 1. The following results are obtained.

$H_2$ partial pressure: 1.63 MPa
$H_2$ selectivity: 72.7%
activity: 86.4 mol·hr⁻¹·kg⁻¹.
$NO_3^-$ selectivity: 76.2%
Efficiency: 68%

This example shows that the efficiency, activity and selectivity are increased.

TABLE 1

Composition and flow rates in experiment A and examples I–III

| Exp. | | line 5 comp. (molar fraction) | line 5 flow (kmol/hr) | lines 2, 2a, 2b comp. (molar fraction) | line 2b flow (kmol/hr) | line 4 comp. (molar fraction) | line 4 flow (kmol/hr) | line 3 comp. (molar fraction) | line 3 flow (kmol/hr) |
|---|---|---|---|---|---|---|---|---|---|
| A | $H_2$ | 0.925 | 202.3 | 0.461 | 16.6 | — | — | — | — |
|   | $N_2$ | 0 | 0 | 0.080 | 2.9 | — | — | — | — |
|   | $CH_4$ | 0.075 | 16.4 | 0.456 | 16.4 | — | — | — | — |
|   | $N_2O$ | 0 | 0 | 0.004 | 0.1 | — | — | — | — |
| I | $H_2$ | 0.925 | 193.6 | 0.461 | 16.5 | 0.938 | 8.5 | 0.299 | 8.0 |
|   | $N_2$ | 0 | 0 | 0.082 | 2.9 | 0.008 | 0.1 | 0.107 | 2.9 |
|   | $CH_4$ | 0.075 | 15.7 | 0.453 | 16.2 | 0.054 | 0.5 | 0.589 | 15.7 |
|   | $N_2O$ | 0 | 0 | 0.004 | 0.1 | 0 | 0 | 0.005 | 0.1 |
| II | $H_2$ | 0.925 | 202.3 | 0.656 | 37.4 | 0.977 | 16.6 | 0.518 | 20.8 |
|   | $N_2$ | 0 | 0 | 0.050 | 2.8 | 0.003 | 0 | 0.070 | 2.8 |
|   | $CH_4$ | 0.075 | 16.4 | 0.293 | 16.7 | 0.02 | 0.3 | 0.409 | 16.4 |
|   | $N_2O$ | 0 | 0 | 0.002 | 0.1 | 0 | 0 | 0.003 | 0.1 |
| III | $H_2$ | 0.925 | 198.0 | 0.617 | 31.4 | 0.972 | 14.8 | 0.466 | 16.6 |
|   | $N_2$ | 0 | 0 | 0.056 | 2.9 | 0.004 | 0.1 | 0.079 | 2.8 |
|   | $CH_4$ | 0.075 | 16.1 | 0.324 | 16.5 | 0.024 | 0.4 | 0.452 | 16.1 |
|   | $N_2O$ | 0 | 0 | 0.003 | 0.1 | 0 | 0 | 0.004 | 0.1 |

The invention claimed is:

1. Process for the preparation of hydroxylammonium, said process comprising: a) feeding gaseous hydrogen to a reaction mixture, said reaction mixture comprising an aqueous reaction medium and a gaseous phase; b) catalytically reducing, in said reaction mixture, nitrate with hydrogen to form the hydroxylammonium ; c) withdrawing a gas mixture from the reaction mixture, said gas mixture comprising gaseous hydrogen and gaseous non-hydrogen compounds; d) separating at least part of the gaseous non-hydrogen compounds from the gas mixture, resulting in a hydrogen-enriched gas; and e) passing the hydrogen-enriched gas to a hydrogenation zone.

2. Process according to claim 1, wherein said process comprises passing the hydrogen-enriched gas to the reaction mixture.

3. Process according to claim 1, wherein said process comprises separating said at least part of the non-hydrogen compounds from said gas mixture by using a membrane.

4. Process according to claim 1, wherein said process comprises separating said at least part of the non-hydrogen compounds from said gas mixture by using pressure swing adsorption.

5. Process according to claim 1, wherein said process comprises separating said at least part of the non-hydrogen compounds from said gas mixture by using cryogene distillation.

6. Process according to claim 1, wherein the molar fraction of hydrogen in the gas mixture is higher than 0.4.

7. Process according to claim 6, wherein the molar fraction of hydrogen in the gas mixture is higher than 0.5.

8. Process according to claim 1, wherein the hydrogen partial pressure in the reaction mixture is higher than 1.0 MPa.

9. Process according to claim 8, wherein the hydrogen partial pressure in the reaction mixture is higher than 1.3 MPa.

10. Process according to claim 1, wherein said at least part of the gaseous non-hydrogen compounds include $N_2$.

11. Process according to claim 1, wherein said at least part of the gaseous non-hydrogen compounds include $OH_4$.

12. Process according to claim 1, wherein said at least part of the gaseous non-hydrogen compounds include $N_2O$.

13. Process according to claim 1, wherein said process is a continuous process.

* * * * *